Y2587 OR 3,692,981

65396
X 64234
X 360/88

United States Patent [15] 3,692,981
Poylo et al. [45] Sept. 19, 1972

[54] CARD READER

[72] Inventors: Michael C. Poylo, New York, N.Y.; Karel J. Staller, Rutherford, N.J.

[73] Assignee: International Telephone and Telegraph Corporation, Nutley, N.J.

[22] Filed: Nov. 12, 1970

[21] Appl. No.: 88,898

[52] U.S. Cl. ....................235/61.11 D
[51] Int. Cl ....................G06k 7/08
[58] Field of Search ..........235/61.12 M, 61.11 D, 235/61.11 R; 179/2 BD

[56] References Cited

UNITED STATES PATENTS

| | | | |
|---|---|---|---|
| 3,560,715 | 2/1971 | Akamatsu et al. | 235/61.11 D |
| 3,069,496 | 12/1962 | Blinken et al. | 235/61.11 D |
| 3,419,710 | 12/1968 | Mathews et al. | 235/61.11 D |
| 3,434,130 | 3/1969 | Lemelson | 235/61.11 D |

*Primary Examiner*—Daryl W. Cook
*Attorney*—C. Cornell Remsen, Jr., Walter J. Baum, Paul W. H. Hemminger, Charles L. Johnson, Jr., Philip M. Bolton, Isidore Togut, Edward Goldberg and Menotti J. Lombardi, Jr.

[57] ABSTRACT

A magnetic card reader including a frame having a pair of channels formed therein, and a slide extending partially across the width of the frame mounted in said channels, said slide being connected by wires at its extreme ends to a spring driven rotary unidirectional clutch which urges said slide means in a direction away from said unidirectional clutch. A magnetically controlled ratchet, contacting gears on said rotary clutch controls the rotation thereof, thereby controlling the movement of said slide away from said clutch. The reader includes a card receiving tray which is mounted adjacent said slide and is moved thereby, thereby providing movement of a card past a magnetic tape head.

6 Claims, 8 Drawing Figures

INVENTORS
MICHAEL C. POYLO
KAREL J. STALLER
BY Herbert Stern
ATTORNEY

INVENTORS
MICHAEL C. POYLO
KAREL J. STALLER
BY Herbert Stern
ATTORNEY

CARD READER

CROSS-REFERENCES TO RELATED APPLICATIONS

This invention is related to U.S. patent application Ser. No. 208,715 entitled Automatic Hotel Security System by Michael C. Poylo, filed Dec. 16, 1971 and assigned to the assignee of the present invention. This invention discloses a magnetic card reader which may be utilized in practicing the invention disclosed in said related application.

BACKGROUND OF THE INVENTION

This invention relates to card readers and more particularly, to such a card reader utilizing a mechanical drive for movement of the card containing the magnetic information.

Card readers of the type well known in the art normally utilize electronic drives and, therefore, require the utilization of small electric motors which are expensive and subject to breakdown. Further, card readers known in the prior art normally utilize complex actuating means for sensing the insertion of a card containing magnetic information and for initiating the operation of the aforementioned electric motor when reading of said magnetic information is to commence.

SUMMARY OF THE INVENTION

Therefore, the main object of this invention is to provide a card reader utilizing a simple and reliable mechanical drive.

It is a further object of this invention to provide a card reader utilizing a simple mechanical and electromechanical switches for signalling the insertion of a card and for initiating the card reading process.

It is yet a further object of this invention to provide a card reader applicable for use with a hotel security system.

It is still another object of this invention to provide a shock indexing arrangement utilizing a mechanical drive.

According to the present invention, there is provided a card reader arranged to receive a magnetic card and magnetically read the information contained thereon, the arrangement comprising a frame having at least one track formed therein, slide means coupled to said track and extending orthogonally thereto, drive means supported by said frame coupled to said slide means actuable to urge said slide means in a first direction along said track, and control means for selectively actuating said drive means coupled thereto, thereby providing movement of said slide means in said first direction to permit the reading of said information during said movement.

Further objects and features of this invention will become more apparent by reference to the following description taken in conjunction with the accompanying drawings, in which:

DESCRIPTION OF THE PREFERRED EMBODIMENT

Figures 1, 2, 3, 4, 5, 7:
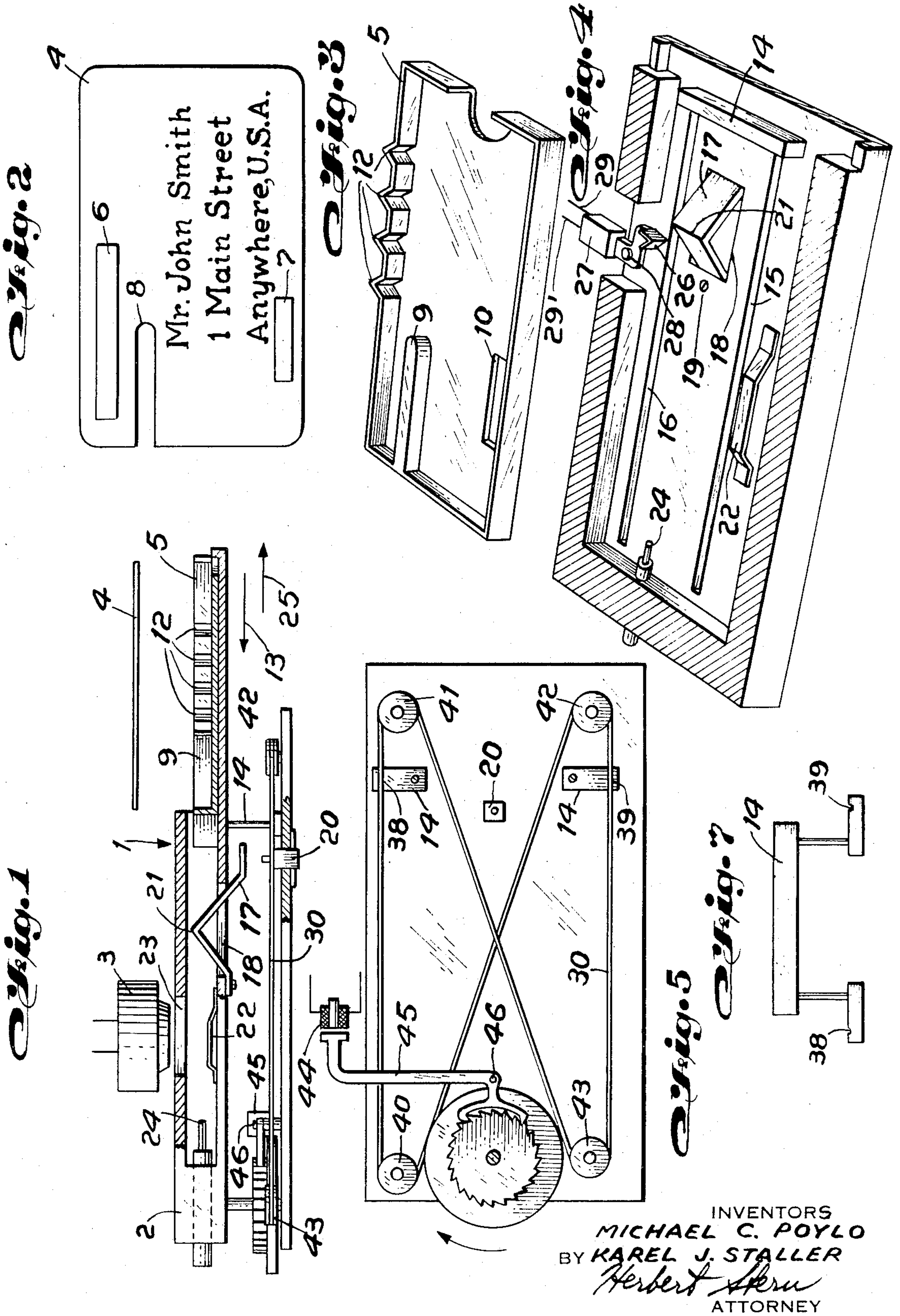
FIG. 1 is a sectional view of an arrangement according to the invention.
FIG. 2 is a plan view of a magnetic card for use with the arrangement of FIG. 1.
FIG. 3 is an isometric view of the card receiving tray used with the arrangement of FIG. 1.
FIG. 4 is an isometric view of a portion of the arrangement shown in FIG. 1.
FIG. 5 is a plan view of part of the arrangement shown in FIG. 1.
FIG. 7 is a plan view of the slide illustrated in FIGS. 1, 4 and 5.

Referring now to FIG. 1, there is shown a magnetic card reader 1 having a frame 2, a magnetic tape head 3, a card 4 of non-magnetic material, e.g., plastic, which is inserted into card receiving tray 5; card 4 and tray 5 being more clearly shown in FIGS. 2 and 3. Card 4 contains magnetic information on areas 6 and 7, area 7 containing the information here of interest. Card 4 is keyed by means of offset slot 8 which corresponds to the keying extension 9 thereby preventing improper insertion of card 4 into receiving tray 5. Tray 5 is formed with an aperture 10 over which magnetic area 7 lies for a reason which will be explained below. Tray 5 may further be formed with a slot such as 11 for facilitating the movement of said tray, and the tray is also formed with coded identification detents 12 which are utilized in a manner which will be explained below. Tray 5, with card 4 properly inserted therein, may be slide in the direction of arrow 13 into contact with slide member 14 which is most clearly shown in FIG. 7. Slide member 14 is moved, along track channels 15 and 16 formed in frame 2, by the movement of tray 5 in the direction of arrow 13, into contact with curved spring 17 which extends through aperture 18 formed in frame 2, spring 17 being held in place in a cantilevered arrangement by pin or rivet 19. The motion in the direction of arrow 13 of slide 14 caused by the movement of tray 5 displaces spring 17 until it contacts switch 20 which is mounted in frame 2. The contacting of switch 20 by spring 17 actuates circuitry which will be more fully explained with regard to FIG. 8 but, which may, in general, be utilized to indicate the commencement of operation of card reader 1. As the receiving tray 5 and slide 14 continue their movement in the direction of arrow 13, spring 17 is displaced until its apex 21 is displaced below the level of aperture 18 and the movement of the slide and tray in the direction of arrow 13 continues until magnetic information carrying area 7 is directly below magnetic tape head 3 and in insulated contact with curved spring 22 which is mounted on frame 2 in such a manner as to extent through aperture 10 to urge area 7 toward tape head 3 so that the information impressed magnetically upon area 7 may be read by the head through aperture 23 formed in frame 2. The placement of area 7 beneath head 3 and above spring 22 is designed to coincide with the closing of switch 24 mounted in frame 2 by the action of slide 14 and tray 5. The closing of switch 24 serves to actuate circuitry in a manner to be explained below but, in any event, the closing of switch 24 provides actuation of a mechanism to urge slide 14, tray 5 and, therefore, card 4 in a direction indicated by arrow 25 so that the information magnetically impressed upon area 7 may be read by tape head 3 during the movement of the card in the direction of arrow 25.

In cases where it is desired that the card reader 1 identify itself, the detents 12 are utilized in conjunction with extension 26 pivotally mounted on frame 2, and electromagnet 27, located to respond to the movement of extension 26. As tray 5 is urged in the direction of arrow 13, detents 12 are contracted by extension 26 which moves about pivot point 28 thereby causing pulsation of electromagnet 27 which transmits signals over wires 28 and 29 to a desired reception point, shown in FIG. 8.

As card 4, tray 5 and slide 14 are moved in the direction of arrow 13 it will be seen, by referring to FIG. 5, that non-extensible link 30, which may be wire, string, etc., is wound about unidirectional clutch 31. Unidirectional clutch 31, which is more clearly shown in FIG. 6, consists of rotary member 32, rotary member 33 having gear teeth 34 formed thereon, ball bearings 35 located in the spacing between rotary members 32 and 33, and a rotary spring 36 being wound upon itself and attached at one end to a shaft 37 and at its other end to the inner wall of rotary member 33. Such a unidirectional clutch is well known in the art and the operation thereof will, therefore, not be explained in detail. It is sufficient to state that it is a mechanism wherein rotary 32 may rotate freely in a clockwise direction while member 33 is held stationary, but that rotary member 32 may rotate in a counter clockwise direction only when rotary member 33 is freed to rotate with member 32. As slide 14 moves in the direction of arrow 13, link 30, which is coupled thereto by means of holding grooves 38 and 39, is wound about rotary member 32 by the rotation of member 32 in a clockwise direction. To insure that slide 14 remains orthogonal to channels 15 and 16 as it is moved with card 4 and tray 5 in the direction indicated by arrow 13, use is made of pulleys 40, 41, 42 and 43 which are mounted, in a rectangular configuration, on frame 2, the extensible link 30 also being wound about said pulleys.

When card 4, tray 5 and slide 14 have been moved in the direction of arrow 13 a distance such that area 7 lies beneath magnetic tape head 3, slide 14 has been brought into contact with switch 24, closing said switch. Switch 24 actuates control means, such as electromagnet 44 which is magnetically coupled to L-shaped ratchet 45 mounted, via pivot 46, to frame 2. The toothed portion 47 of ratchet 45 is in contact with gear teeth 34 of rotary member 33, preventing the counter clockwise rotation of members 32 and 33. Due to the closing of switch 24, suitable pulses are provided to electromagnet 44 thereby providing for the intermittent disengagement of ratchet teeth 47 from gears 34 and thereby allowing the counter clockwise rotation of said unidirectional clutch. This counter clockwise rotation of clutch 31 allows the unwinding of link 30 from about member 32 thereby causing the movement, in the direction of arrow 25, of slide 14, tray 5 and card 4. As card 4 moves in the direction of arrow 25, the magnetic information stored on area 7 is read by magnetic tape head 3 and transmitted to any desired utilization circuitry.

Figures 6, 8:
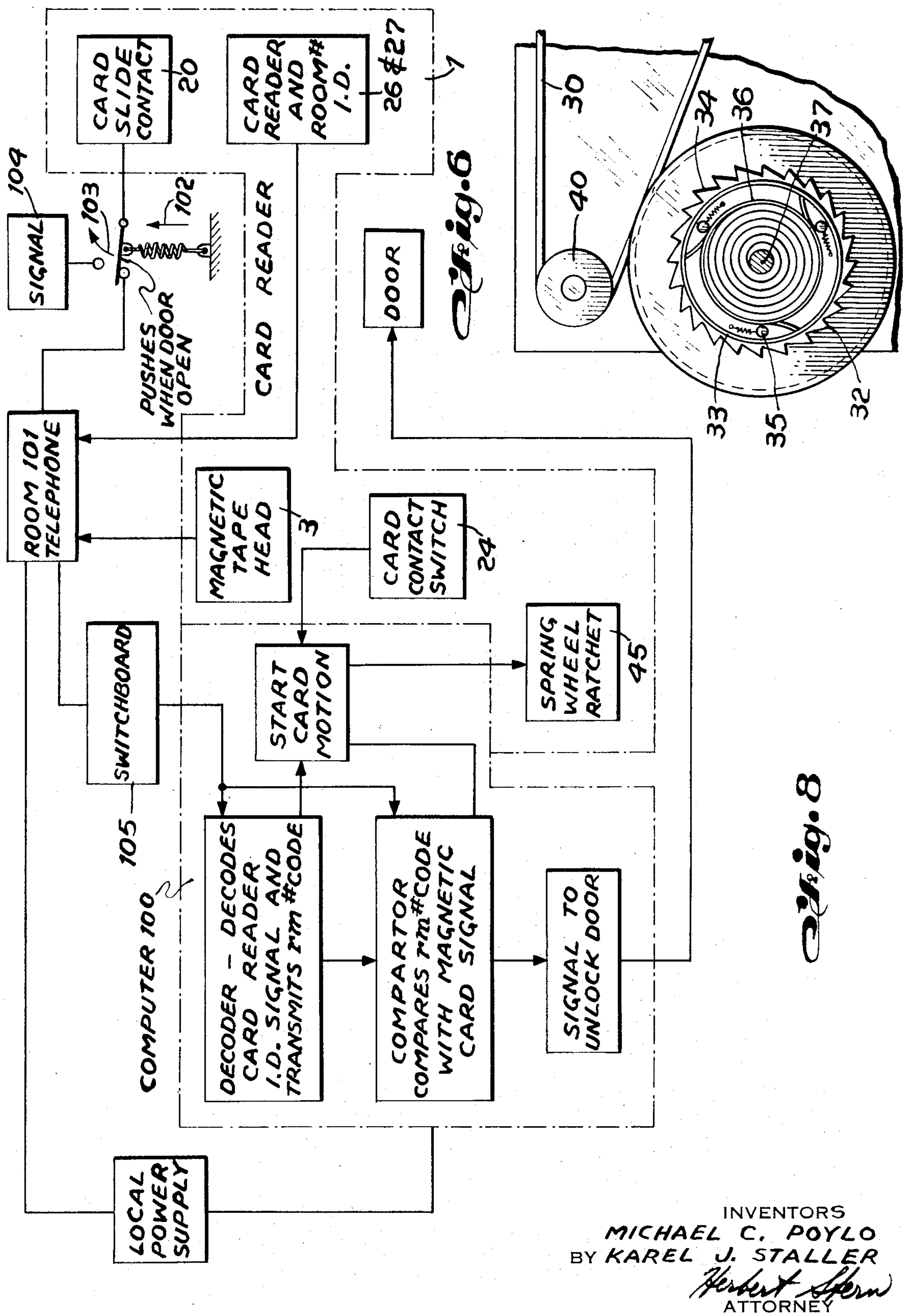
FIG. 6 is a plan view of the gear driven rotary mechanism shown in FIGS. 1 and 5.
FIG. 8 is a block diagram illustrating the use of the arrangement of FIG. 1 in a hotel security system.

Referring now to FIG. 8, there is shown a card reader of the type discussed above interconnected with a computer 100 which may be utilized in a hotel security system of the type disclosed in the cross-referenced U.S. patent application. As card receiving tray 5 with card 4 inserted therein is moved in the direction of arrow 13 thereby moving slide 14 to depress spring 17 and close contact 20, a signal is sent from contact 20 to a telephone 101 in a hotel room, it being assumed that said hotel room is secured the action of contact 20 essentially placing the telephone in an "off-hook" position. For the condition where the hotel room door is already open and therefore no magnetic card "key" is required to unsecure the room, a spring pusher 102 may be provided, said pusher opening a switch 103 between slide contact 20 and telephone 101 thereby preventing the contact 20 from placing telephone 101 in the "off-hook" condition. Further, a signal 104 may be provided, the action of pusher 102 moving switch 103 into contact with a terminal of signal 104, thereby activating said signal.

Returning now to the condition where the hotel room is secured, the further movement of tray 5 in the direction of arrow 13 will cause detents 12 to be "read" by extension 26 in conjunction with electromagnet 27. The action of extension 26 and electromagnet 27 connects the card reader with the computer 100 through "off-hook" telephone 101 and, additionally, to identify the card reader which is now connected with the computer, by means of the coded configuration of detents 12. The connection between room telephone 101 and computer 100 may be made most conveniently through a standard hotel switchboard such as 105. Further movement of card 4, tray 5 and slide 14 in the direction of arrow !3 will cause the closing of contact 24, this switch thereby sending a start card motion signal to computer 100, the computer thereupon providing a pulse signal to ratchet 45 via electromagnet 44. The decoder portion of the computer which has received the coded identification of the card reader from units 26 and 27 over the hotel telephone lines translates these signals into a code impressed upon area 7 of the card, this coded area 7 being for the purpose of unsecuring the desired room. The signal from the decoder section of the computer is applied to the comparator section. As ratchet 45 is pulsed, card 4 will travel in the direction of arrow 25 and area 7 will pass under magnetic tape head 3. Magnetic tape head 3 transmits the information read, via the hotel telephone lines to the comparator section of the computer which in turn will, if an affirmative comparison made between the information read from area 7 and the translated signal from the computer decoder section transmit a signal ordering the secured hotel room door to open.

While we have described above the principles of our invention in connection with specific apparatus, it is to be clearly understood that this description is made only by way of example and not as a limitation to the scope of our invention as set forth in the objects thereof and in the accompanying claims.

We claim:

1. A card reader arranged to receive a magnetic card and magnetically read the information contained thereon, the arrangement comprising:

a frame having at least one track formed therein;

slide means coupled to said track and extending orthogonally thereto;

drive means supported by said frame coupled to said slide means actuable to urge said slide means in a first direction along said track, said drive means comprising;

spring driven rotary means formed with gear teeth; and a non-extensible link, pulley mounted on said frame and coupled to said rotary means and to said slide means, disposed to maintain said slide orthogonal to said track during said movement in said first direction; and control means for selectively actuating said drive means coupled thereto thereby providing movement of said slide means in said first direction to permit the reading of said information during said movement, said control means comprising;

ratchet means pivotally mounted on said frame to contact said gear teeth; and a pulsed electromagnet positioned to intermittently cause movement of said ratchet.

2. A magnetic card security system comprising:

a card reader adapted to receive a magnetic card in a first direction and to index said card in a second, opposite direction, to read the information contained thereon during said indexing;

a secured area having a telephone set therein;

computer means for storing and processing discrete bits of information storing information associated with said area;

connecting means disposed in said card reader for actuating said telephone set and connecting said card reader to said computer via said actuated set;

means coupled to said card reader for transmitting the information on said card to said computer where it is compared with the information associated with said area, said computer providing an affirmative signal if said comparison is affirmative; and operative means coupled to said secured area responsive to said affirmative signal for unsecuring said area.

3. A magnetic card security system, according to claim 2, wherein said connecting means comprises:

contact means activating said telephone set;

dialing means coupling said card reader to said computer, and means identifying said card reader to said computer.

4. A card reader arranged to receive a magnetic card and magnetically read the information contained thereon, the arrangement comprising:

a frame having at least one track formed therein;

slide means coupled to said track and extending orthogonally thereto;

drive means supported by said frame coupled to said slide means actuable to urge said slide means in a first direction along said track;

control means for selectively actuating said drive means coupled thereto thereby providing movement of said slide means in said first direction to permit the reading of said information during said movement;

card receiving means slidably mounted on said frame adjacent one side of said slide means adapted to be moved in a second direction opposite to said first direction to urge said slide means in said second direction;

first switching means mounted on said frame responsive to the movement of said card receiving means in said second direction for initiating the operation of said card reader; and second switching means coupled to said frame and to said control means for triggering said control means upon the movement of said card receiving means in said second direction for a selected distance.

5. A card reader, according to claim 4, wherein said first switching means comprises:

spring means disposed in said frame adjacent a second slide, opposite said one side, of said slide means and in resilient contact therewith, positioned to be displaced by the movement, in said second direction, of said slide means; and a switch coupled to said frame and positioned to be actuated by the displacement of said spring means.

6. A card reader arranged to receive a magnetic card and magnetically read the information contained thereon, the arrangement comprising:

a frame having at least one track formed therein;

slide means coupled to said track and extending orthogonally thereto;

drive means supported by said frame coupled to said slide means actuable to urge said slide means in a first direction along said track;

control means for selectively actuating said drive means coupled thereto thereby providing movement of said slide means in said first direction to permit the reading of said information during said movement;

card receiving means slidably mounted on said frame adjacent one side of said slide means adapted to be moved in a second direction opposite to said first direction to urge said slide means in said second direction;

a plurality of coded identifying detents formed in one side of said card receiving means; and magnetic detent reading means mounted on aid frame and positioned to be responsive to the movement of said card receiving means in said second direction.

* * * * *